United States Patent [19]

Chyung et al.

[11] Patent Number: 4,755,489

[45] Date of Patent: * Jul. 5, 1988

[54] REINFORCED CALCIUM ALUMINOSILICATE GLASS-CERAMICS

[75] Inventors: Kenneth Chyung, Painted Post; Kishor P. Gadkaree; Ronald L. Stewart, both of Big Flats; Mark P. Taylor, Painted Post, all of N.Y.

[73] Assignee: Corning Glass Works, Corning, N.Y.

[*] Notice: The portion of the term of this patent subsequent to Oct. 7, 2003 has been disclaimed.

[21] Appl. No.: 943,072

[22] Filed: Dec. 18, 1986

[51] Int. Cl.$^4$ .................. C03C 10/06; C03C 14/00; C04B 35/56
[52] U.S. Cl. .......................... 501/8; 501/32; 501/89; 501/95
[58] Field of Search .................. 501/32, 8, 89, 95

[56] References Cited

U.S. PATENT DOCUMENTS 4,615,987 10/1986 Chyung .................. 501/95

*Primary Examiner*—Mark L. Bell
*Attorney, Agent, or Firm*—Clinton S. Janes, Jr.

[57] ABSTRACT

The present invention is directed to the production of SiC whisker- and/or fiber-reinforced, internally-nucleated glass-ceramic matrix composite articles consisting essentially of 0.5–60% by weight SiC whiskers and/or 15–70% by volume ceramic fibers substantially uniformly distributed in a glass-ceramic matrix consisting essentially, in weight percent on the oxide basis, of 16–20%, CaO, 38.5–46% $Al_2O_3$, 35–42% $SiO_2$, and up to 10% total of at least one nucleating agent in the indicated proportion selected from the group consisting of 0.1–3% $Cr_2O_3$, 0.25–3% $HfO_2$, 2–5% $MoO_3$, 0.25–3% $Nb_2O_5$, 0.25–3% $Ta_2O_5$, 0.25–3% $WO_3$, and 1–10% $ZrO_2$, wherein $Al_2O_3$ is present in an amount which is at least 5 mole percent and up to 50 mole percent in excess of that present in stoichiometric triclinic anorthite, and wherein the predominant crystal phases in the glass-ceramic are triclinic anorthite and mullite and/or $\alpha$-$Al_2O_3$. Up to 1.5% $As_2O_3$ may advantageously be included in the composition.

6 Claims, No Drawings

REINFORCED CALCIUM ALUMINOSILICATE GLASS-CERAMICS

BACKGROUND OF THE INVENTION

U.S. Pat. No. 4,615,987 discloses the production of glass-ceramic articles, wherein the predominant crystal phase is selected from the group of anorthite, triclinic $(CaO,SrO).Al_2O_3.2SiO_2$, and its pseudo-binaries with mullite $(3Al_2O_3.2SiO_2)$, cordierite $(2MgO.2Al_2O_3.5SiO_2)$, barium osumilite $(BaO.2MgO.3Al_2O_3.9SiO_2)$, albite solid solution $(Na_2O.Al_2O_3.6SiO_2)$, gehlenite $(2CaO.Al_2O_3.SiO_2)$, $Al_2O_3$, $SiO_2$, and $CaO.SiO_2$, reinforced through the entrainment therein of SiC fibers, SiC whiskers, or mixtures of SiC whiskers with fibers selected from the group of SiC, carbon, $B_4C$, BN, mullite, spinel, $ZrO_2$, zircon, glass, and $Al_2O_3$. In general, the reinforced composite articles exhibited use temperatures up to 1300° C. and utilized about 10-60% by volume SiC whiskers and/or 15-70% by volume fibers. The inclusion of whiskers imparted a substantial improvement in mechanical strength and a great enhancement in fracture toughness to the base glass-ceramics. The entrainment of fibers provided a great increase in mechanical strength and microcrack yield stress to the original glass-ceramics. The hybrid composite articles, i.e., the glass-ceramics containing both fibers and whiskers, evidenced significant improvements in the overall mechanical properties displayed by the articles. Of particular importance was the extraordinary increase in microcrack yield stress resulting from the combination of fibers and whiskers. The overall effect upon the other mechanical properties of the glass-ceramics generated by the combination of both fibers and whiskers was not as large as the sum of the two actions, but was considerably greater than the average of the two.

The glass-ceramics claimed in that patent were encompassed within the alkaline earth aluminosilicate system and consisted essentially, expressed in terms of weight percent on the oxide basis, of:

| | | | |
|---|---|---|---|
| CaO | 0-25 | MgO | 0-15 |
| SrO | 0-30 | $Na_2O$ | 0-4 |
| CaO + SrO | 10-30 | $K_2O$ | 0-6 |
| $Al_2O_3$ | 25-38 | $TiO_2$ | 0-12 |
| $SiO_2$ | 35-60 | $ZrO_2$ | 0-15 |
| BaO | 0-25 | $As_2O_3$ | 0-3 |
| BaO + MgO + $Na_2O$ + $K_2O$ + $TiO_2$ + $ZrO_2$ + $As_2O_3$ | 0-30 | | |

In general, a nucleation agent, e.g., $TiO_2$, was not included in the compositions but, instead, the precursor glass was comminuted to extremely finely-divided particles, normally to an average size smaller than 10 microns, and surface nucleation relied upon.

Further laboratory work has indicated that surface nucleation has several processing-related drawbacks. To illustrate:

The composites containing whiskers cannot be sintered into an integral body of substantial bulk exhibiting nearly full density at temperatures below the liquidus temperature for the composition. The composite may be sintered to dense bodies at temperatures above the liquidus temperature, but at such temperatures the desired crystalline assemblage cannot be developed because the multitudes of surfaces necessary for proper nucleation are no longer present. Consequently, such whisker-containing composites must generally be formed into articles through hot pressing or hot isostatic pressing below the liquidus temperature. Those methods of shaping articles are not only expensive, when compared to simple sintering, but also are limited in the type and complexity of the shapes that can be fabricated. For example, an extruded honeycomb structure cannot be formed through either of those processes.

Furthermore, fiber-containing composites currently prepared with surface nucleated compositions have been subject to unfavorable reliability with respect to crystallization. Thus, the parameters of the processing schedule are very critical and, if pressure is applied and compaction takes place prior to crystallization, the matrix will remain glassy with the desired high temperature properties of the final product deleteriously affected. Also, the temperature at which the composite article is consolidated must be carefully controlled to secure well-consolidated and well-crystallized composites.

We have found that glass-ceramic compositions containing nucleating agents, such that internal nucleation takes place, do not suffer from those shortcomings. Accordingly, sintering of whisker-reinforced composites may be undertaken at temperatures above the liquidus to insure the formation of an article of nearly full density, and, thereafter, the article is heat treated to effect crystallization in situ. Furthermore, the fabrication of composites containing fibers becomes substantially process insensitive and the glass-ceramic matrix more completely and uniformly crystallized when an internal nucleating agent is incorporated into the composition. That process insensitivity is of special importance in fabricating large, thick-walled parts where significant temperature gradients may be encountered. However, $TiO_2$, the traditional nucleating agent for converting aluminosilicate glasses into glass-ceramics, cannot be used with SiC fibers or whiskers since titanium silicide is formed which adversely affects the mechanical strength of the fibers and whiskers. Moreover, because composites exhibiting still higher use temperatures were sought, the fluxing action of $TiO_2$ must be avoided.

Therefore, the primary objectives of the present invention were two:

(1) to discover nucleating agents suitable for use with glass-ceramic bodies prepared from compositions in the alkaline earth aluminosilicate system to serve as matrices for SiC whiskers and/or fibers; and (2) to develop glass-ceramic bodies in the alkaline earth aluminosilicate system exhibiting higher refractoriness than those claimed in U.S. Pat. No. 4,615,987.

Because the present invention is an improvement thereupon and because that patent details processes for the fabrication of alkaline earth aluminosilicate glass-ceramic articles containing SiC whiskers or SiC fibers, and hybrid composites containing both whiskers and fibers, the disclosure of that patent is incorporated herein in its entirety.

SUMMARY OF THE INVENTION

We have found a narrow range of compositions within the $CaO·Al_2O_3·SiO_2$ system, wherein $Al_2O_3$ is present in an amount which is at least 5 mole percent and can be up to 50 mole percent in excess of that present in triclinic anorthite, which compositions can be nucleated internally with a nucleating agent selected from the group consisting of $Cr_2O_3$, $HfO_2$, $MoO_3$, $Nb_2O_5$, $Ta_2O_5$, $WO_3$, and $ZrO_2$ to yield highly crystalline glass-ceramic bodies containing triclinic anorthite and mullite and/or α-$Al_2O_3$ as the predominant crystal phases. Greater refractoriness and improved overall mechanical properties can be achieved in compositions wherein the $Al_2O_3$ content is at least 10 mole percent in excess of that present in anorthite. The inventive glass-ceramics exhibit use temperatures above 1300° C., with the preferred compositions being capable of withstanding temperatures up to 1350° C., and are eminently suitable as matrices for the entrainment of SiC whiskers and SiC fibers, and for the production of hybrid composites containing both SiC whiskers and fibers. Compositions required for the inventive glass-ceramics consist essentially, expressed in terms of weight percent on the oxide basis, of 16-20% CaO, 38.5-46% $Al_2O_3$, 35-42% $SiO_2$, and up to 10% total of at least one nucleating agent in the indicated proportion selected from the group consisting of 0.1-3% $Cr_2O_3$, 0.25-3% $HfO_2$, 2-5% $MoO_3$, 0.25-3% $Nb_2O_5$, 0.25-3% $Ta_2O_5$, 0.25-3% $WO_3$, and 1-10% $ZrO_2$. Although not a mandatory component, the presence of $As_2O_3$ appears to exert a favorable effect upon the mechanical properties demonstrated by the inventive bodies. Accordingly, the preferred compositions contain 0.25-1.5% $As_2O_3$.

The above ranges encompass compositions specifically designed to produce glass-ceramic bodies containing anorthite as the major crystal phase with a substantial proportion of mullite and/or α-$Al_2O_3$ crystallization. As was noted previously, the addition of $Al_2O_3$ to the anorthite stoichiometry provides a body of higher refractoriness than that attainable where anorthite is the sole crystal phase. Nevertheless, $Al_2O_3$ concentrations in excess of 50 mole percent of that present in anorthite do not appear to significantly improve the refractory properties of the glass-ceramics and can lead to glass processing problems. For example, the batch materials are required to be melted at temperatures in excess of 1650° C. to secure a homogeneous melt. Also, spontaneous devitrification of the melt during cooling to a glass can be encountered. Accordingly, the levels of CaO and $SiO_2$ are adjusted to insure the generation of crystals having an anorthite stoichiometry, while permitting the inclusion of excess $Al_2O_3$. In general, $SiO_2$ will be included in sufficient amounts to react with at least a portion of the excess $Al_2O_3$ to form the highly refractory phase mullite. Whereas the mechanism underlying the phenomenon is not understood, the presence of $As_2O_3$ appears to enhance the mechanical strength of the glass-ceramics, especially the strength measured at room temperature. Thus, $As_2O_3$ contributes a positive effect to the properties of the final product and does not simply perform its conventional function as a glass fining agent. Greater amounts of the nucleating agents may optionally be employed, but such excesses do not appear to have any favorable effect upon the physical characteristics of the final product. Moreover, such additions can result in the development of unwanted crystal species.

The processes for producing composites containing whiskers, continuous fibers, and discontinuous fibers, and hybrid composites containing whiskers plus continuous fibers, as disclosed in U.S. Pat. No. 4,615,987, are equally applicable with the inventive materials. To illustrate:

As was explained in that patent, because SiC whiskers are so small in cross section, but present a high aspect ratio, they are always in agglomerated form as purchased. Those agglomerates of whiskers must be broken up to avoid improper consolidation of the body within which they are entrained with consequent weak spots therein. The patent first recites the technique disclosed in U.S. Pat. No. 4,463,058 for deagglomerating SiC whiskers and thereafter describes the use of a shear mixer to accomplish the same purpose. This latter technique is preferred in the present invention.

In like manner to the disclosure of U.S. Pat. No. 4,615,987, the preferred practice of the instant invention contemplates utilizing whiskers having thicknesses of less than 100 microns and length-to-diameter ratios of at least 5 at loadings between about 5-60% by weight. Hence, whereas loadings of as little as about 0.5% by weight can exert an effect, very significant improvements in mechanical strength and fracture toughness are experienced at loadings greater than 5%. Likewise, loadings of continuous ceramic fibers between about 15-70% by volume are preferred. Also, SiC whiskers may be employed in conjunction with continuous ceramic fibers such as SiC, $Si_3N_4$, BN, $B_4C$, $ZrO_2$, zircon, carbon, mullite, spinel, or $Al_2O_3$ to produce hybrid composite bodies, as described in U.S. Pat. No. 4,615,987, the total content of whiskers plus fibers not exceeding about 70% by weight. Finally, composites containing discontinuous ceramic fibers can be prepared by chopping continuous fibers to proper length (~1-3 cm) through conventional means, forming the chopped fibers into sheets via known papermaking processes, and then entraining stacks of such sheets into a glass matrix by known techniques.

Because the inventive glass-ceramic products utilize an internal nucleating agent, articles of complex configurations and exhibiting essentially full density can be readily prepared by sintering shapes formed from glass powders of the proper compositions. Sintering can be carried out at temperatures above the liquidus temperature and the desired crystalline assemblages obtained through concurrent or subsequent heat treatment of the consolidated body due to the presence of a nucleating agent therein. This capability of employing simple sintering not only reduces forming processing costs, but also permits the shaping of bodies of geometries impossible to achieve by pressing; for example, honeycomb structures can be extruded from glass particles, sintered to essentially full density, and simultaneously or thereafter crystallized in situ. It will be appreciated, of course, that all of the other forming methods conventional in the ceramic art such as injection molding, dry pressing, hot pressing, and hot isostatic pressing are equally operable with the present inventive compositions. Although the glasses resulting from the inventive compositions can be crystallized in situ at temperatures as low as about 1150° C., consolidation temperatures between about 1300°-1550° C. are customarily used to insure essentially full density in the inventive products.

The most preferred base compositions consist essentially, expressed in terms of weight percent on the oxide basis, of 16-18% CaO, 40-46% $Al_2O_3$, 35-38% $SiO_2$, and 0.5-1.0% $As_2O_3$, plus nucleating agent.

PRIOR ART

U.S. Pat. No. 3,531,303 discloses the preparation of glass-ceramic articles wherein a hexagonal alkaline earth feldspar constitutes the predominant crystal phase and wherein, occasionally, a triclinic alkaline earth feldspar is found in substantial quantities. The articles consist essentially, in weight percent on the oxide basis, of 0–35% CaO, 0–53% SrO, 0–55% BaO, 10–55% CaO+SrO+BaO, 10–58% Al₂O₃, and 12–53% SiO₂, with a nucleating agent selected from the group of ZnS, V₂O₅, MoO₃, CaF₂, WO₃, NiO, Au, Pt, Rh, Pd, Ir, and Fe₂O₃+FeO. Heat treatments operable for transforming the precursor glass into a glass-ceramic range between 850°–1700° C. No mention is made of forming SiC whisker or fiber reinforced composite articles. No reference is made to glass-ceramics containing anorthite and mullite and/or α-Al₂O₃ as the crystal phases. Therefore, there is no discussion of the restricted levels of CaO, Al₂O₃, and SiO₂ demanded to produce composite articles demonstrating the desired properties.

U.S. Pat. No. 3,772,041 describes the formation of glass-ceramic articles containing crystals of anorthite and/or gehlenite from compositions within the general ranges, in weight percent, of 10–35% CaO, 20–50% Al₂O₃, 16–38% SiO₂, and 6–15% ZrO₂. Heat treatments operable for converting the precursor glass into glass-ceramic range between 1000°–1500° C. No mention is made of mullite and/or α-Al₂O₃ crystals being present in the glass-ceramics. No reference is made to composite articles reinforced with SiC whiskers or fibers. Accordingly, there is no indication that the narrowly-limited, present inventive compositions would yield composite articles exhibiting the desired properties.

U.S. Pat. No. 4,187,115 is concerned with the production of glass-ceramic articles, wherein triclinic anorthite and rutile comprise the crystal phases present, from compositions consisting essentially, in weight percent on the oxide basis, of 10–18% CaO, 29–35% Al₂O₃, 30–39% SiO₂, and 13–20% TiO₂. Up to 10% total of the following ingredients in the indicated proportions may optionally be included: up to 3% MgO, up to 10% SrO, up to 5% BaO, up to 7% PbO, up to 5% CdO, up to 6% P₂O₅, and up to 1.5% F. Crystallization temperatures vary between 1000°–1400° C. No reference is made to SiC whiskers or fibers; consequently, there is no discussion of the specific ranges of CaO, Al₂O₃, and SiO₂ demanded in the base compositions of the present invention to yield glass-ceramics demonstrating the desired properties. Furthermore, TiO₂ is a required component in quite substantial amounts, whereas the essential absence of TiO₂ in the present inventive compositions is necessary.

DESCRIPTION OF PREFERRED EMBODIMENTS

Table I reports a number of thermally crystallizable glass compositions, expressed in terms of parts by weight on the oxide basis, which, when subjected to the heat treatment practice of instant invention, will crystallize in situ to highly crystalline glass-ceramic articles wherein the crystals are relatively uniform in size. Because the sum of the tabulated components totals or closely approaches 100, for all practical purposes the values listed may be deemed to reflect weight percent. The actual batch ingredients may comprise any materials, either oxides or other compounds, which, when melted together, will be converted into the desired oxide in the proper proportions. For example, CaCO₃ can provide the source of CaO.

In the laboratory activity described hereinafter, the batch ingredients were compounded, dry ballmilled together to assist in securing a homogeneous melt, and charged into platinum crucibles. The crucibles were introduced into a gas-fired furnace operating at 1650° C., the batches therein melted for 16 hours, the melts poured onto a steel plate to form generally circular glass slabs, and the glass slabs were immediately transferred to an annealer operating at about 600°–750° C., depending upon the composition of the glass. The annealed slabs appeared to be essentially clear and free of defects.

TABLE I

| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| SiO₂ | 39.5 | 40.8 | 39.5 | 40.8 | 40.8 | 40.8 | 40.8 | 40.8 | 40.4 | 39.0 | 37.8 | 38.9 | 36.5 | 37.1 | 35.4 | 36.1 | 39.5 |
| Al₂O₃ | 38.5 | 39.7 | 38.5 | 39.7 | 39.7 | 39.7 | 39.7 | 39.7 | 37.7 | 39.7 | 41.6 | 42.5 | 43.4 | 44.1 | 45.0 | 46.0 | 38.5 |
| CaO | 18.4 | 19.0 | 18.4 | 19.0 | 19.0 | 19.0 | 19.0 | 19.0 | 18.8 | 18.2 | 17.6 | 15.6 | 17.0 | 17.3 | 16.5 | 16.9 | 18.4 |
| As₂O₃ | 0.5 | 0.5 | 0.5 | 0.5 | 0.5 | 0.5 | 0.5 | 0.5 | — | — | 0.5 | 0.5 | 0.5 | 0.5 | 0.5 | 0.5 | 1.0 |
| ZrO₂ | 3.0 | — | — | — | — | — | — | — | 3.0 | 3.0 | 3.0 | 3.0 | — | 3.0 | 3.0 | 3.0 | 3.0 |
| Cr₂O₃ | — | 0.1 | — | — | — | — | 1.0 | — | — | — | — | | | | | | |
| MoO₃ | — | — | 3.0 | — | — | — | | | | | | | | | | | |
| HfO₂ | — | — | — | 0.5 | — | — | | | | | | | | | | | |
| Nb₂O₅ | — | — | — | — | 0.5 | — | | | | | | — | — | 1.0 | — | 0.5 | — |
| WO₃ | — | — | — | — | — | 0.5 | | | | | | | | | | | |
| Ta₂O₅ | | | | | | | — | 0.5 | — | — | — | | | | | | |

Compositions 1–8 contained 15 mole percent Al₂O₃ in excess of that present in the stoichiometry of anorthite. Example 9 contained 10 mole percent excess Al₂O₃; Example 10 contained 20 mole percent excess Al₂O₃; Example 11 contained 30 mole percent excess Al₂O₃; Example 12 contained 50 mole percent excess Al₂O₃; Example 13 contained 40 mole percent excess Al₂O₃; Example 14 contained 40 mole percent excess Al₂O₃; Example 15 contained 50 mole percent excess Al₂O₃; Example 16 contained 50 mole percent excess Al₂O₃; and Example 17 contained 15 mole percent excess Al₂O₃.

Small pieces were cut from each slab, introduced into an electrically-heated furnace, and crystallized in situ to glass-ceramic bodies by first heating at about 800°–900° C. for two hours and then heating at 1200° C. for two hours. X-ray diffractometry identified triclinic anorthite and mullite and/or α-Al₂O₃ as essentially the sole crystal phases.

Composite articles containing SiC whiskers were fabricated in like manner to the laboratory procedure outlined in U.S. Pat. No. 4,615,987. Hence, ARCO SC-9 SiC whiskers marketed by Atlantic Richfield Company, Los Angeles, Calif. were added to a mixture of distilled water, isopropanol, and an organic binder such as a polyethylene glycol binder or a polyvinyl acetate binder in a Waring blender. The blender was energized for five minutes to deagglomerate the whiskers and produce a uniform suspension. The whiskers had diameters of about 1 micron or somewhat less and lengths of about 40–50 microns. Parts of the above glass slabs were comminuted to particles having an average size less than 10 microns. Those glass powders were added to the whisker-containing suspension and the blender energized for five minutes to insure a uniform suspension. The suspension was then vacuum-filtered through a Buechner funnel. The resulting filter cake was dried, charged into a bar-shaped graphite mold having a molybdenum liner, the mold moved into a resistance-heated press capable of being operated in the presence of a controlled atmosphere, and the material consolidated for 30 minutes at a temperature of 1500° C. and a pressure of 1500 psi in an atmosphere of flowing nitrogen (a nonoxidizing atmosphere). Thereafter, the bar was exposed for two hours at 900° C. followed by two hours at 1200° C. to achieve complete crystallization in situ. Each composite contained about 30% by weight whiskers.

Table II records average flexural strengths exhibited by the bars of several of the exemplary compositions of Table I, reported as modulus of rupture (MOR) in terms of psi, as measured utilizing the standard four point bend test at 25° C. (room temperature) and 1200° C.

TABLE II

| Example | MOR, 25° C. | MOR, 1200° C. |
|---|---|---|
| 1 | 60,000 | 36,000 |
| 3 | 54,000 | 35,000 |
| 7 | 50,000 | 33,000 |
| 15 | 65,000 | 35,000 |
| 16 | 54,000 | 40,000 |

A range of temperatures and pressures can be employed in conventional hot pressing techniques. Nevertheless, that forming practice will be carried out at temperatures where the glass frit (powder) demonstrates a maximum viscosity below about $10^{13}$ poises, i.e., the annealing point thereof (and below the liquidus temperature of the glass).

Furthermore, it will be appreciated that polar liquids other than water may be utilized in providing the liquid for suspending the whiskers and glass particles, but to no significant advantage in subsequently measured properties, and the identity of the organic binder does not appear to assume importance so long as it is soluble in water or other polar liquid. Organic binders are of great practical importance in enhancing the green (unfired) strength of bodies formed at temperatures in the vicinity of ambient, for example, through dry pressing, extruding, and injection molding, which are subsequently fired to essentially full density.

Bars containing about 30% by weight deagglomerated SiC whiskers of the type described above and 70% by weight glass powder of Example 1, 3, and 13 (plus organic binder) were dry pressed at room temperature (~25° C.). The bars were then fired for 30 minutes in a resistance-heated furnace operating at 1500° C. with an atmosphere of flowing nitrogen to yield sintered products exhibiting essentially full density. Moduli of rupture averaging about 45,000 psi were measured at 25° C. on the sintered bars which had been heated for two hours at 900° C. followed by two hours at 1200° C.

Honeycomb structures containing 20% by weight deagglomerated SiC whiskers of the type described above and 80% by weight glass powder of Example 1 (plus organic binder) were extruded at room temperature. The structures were fired for 30 minutes in a resistance-heated furnace operating at 1500° C. with an atmosphere of flowing nitrogen. Axial crush strengths averaging about 38,000 psi were measured on the essentially full density, sintered structures containing 200 cells/in$^2$ utilizing Method B of ASTM C365-57, Flatwise Compressive Strength of Sandwich Cores. Those levels far exceed the 12,000 psi axial crush strength value typically encountered in whisker-free, sintered honeycombs.

Composite articles containing continuous SiC fibers were fabricated in like manner to the laboratory procedure discussed in U.S. Pat. No. 4,615,987. Hence:

(a) a continuous fiber from a spool was passed through an aqueous slurry of powdered glass containing an organic binder, such as polyvinyl acetate, to coat the fiber;

(b) excess slurry was removed from the fiber;

(c) the fiber was wrapped around a rotating drum to produce flat sheets (prepregs) wherein the fibers have a unidirectional orientation and are held by the organic binder;

(d) the prepregs were cut to conform to the lateral dimensions of the article to be formed, in this instance a 3" diameter disc;

(e) the cut prepregs were stacked in unidirectional orientation to a height to produce the vertical dimension of the article to be formed;

(f) the stacked prepregs were heated in air to burn out the organic binder, typically at temperatures about 400°-650° C., preferably at about 450° C. for two hours; and (g) the stacked prepregs were consolidated into an integral body at temperatures customarily varying about 1250°-1450° C.

In the composites reported below in Table III, the fiber content was about 30% by volume. After the organic binder had been burned out (at ~450° C. in air), the stack of prepregs was inserted into a graphite mold having a molybdenum liner and the mold moved into a resistance-heated press capable of being operated in a controlled atmosphere. The stack of plies was subsequently consolidated by pressing for 10 minutes under a pressure of 1500 psi at the temperatures recited in Table III in an atmosphere of flowing nitrogen (a nonoxidizing atmosphere). To insure essentially complete crystallization in situ, the mold was cooled to 1200° C. and maintained at that temperature for two hours. Table III recites the average flexural strength demonstrated by several of the Examples of Table I, measured at room temperature (~25° C.), at 1300° C., and at 1325° C., utilizing the conventional four point bend procedure, reported as modulus of rupture (MOR) in terms of kpsi. Table III also records the microcrack yield stress (MCY in terms of psi) as measured at 25° C. The MCY stress is the flexural stress on the composite when the glass-ceramic matrix begins to microcrack as a result of the fact that the failure or fracture strain of the fibers is much higher than that of the matrix (~1.5 vs. ~0.1%). After the MCY point is passed, the share of the load increases while the Young's modulus of the matrix decreases. Stated in a different manner, the MCY point constitutes the stress where the stress-strain curve becomes non-linear. At the ultimate stress or MOR value, the fibers carry all of the load. The MCY stress level is of great practical significance since, depending upon the application a product is intended to serve and/or the environmental conditions to which a product may be subjected, it may comprise the design limit of the composite. MCY stress cannot be measured on composites reinforced solely with whiskers because the length of the whiskers is not sufficient to prevent such articles from breaking suddenly in a manner similar to that of monolithic glass-ceramic bodies.

TABLE III

| Example | Press Temp. | MOR (25° C.) | MOR (1300° C.) | MOR (1325° C.) | MCY |
|---|---|---|---|---|---|
| 1 | 1340° C. | 81 | 54 | 40 | 42 |
| 2 | 1350° C. | 60 | 41 | 28 | 45 |
| 5 | 1350° C. | 94 | 67 | 63 | 45 |
| 13 | 1370° C. | 71 | 66 | 65 | 31 |
| 15 | 1300° C. | 115 | 71 | 74 | 39 |
| 17 | 1340° C. | 127 | 49 | — | 35 |

The significant effect which $As_2O_3$ has upon room temperature modulus of rupture is evident from a comparison of Example 1 with Example 17. The base compositions of the two products are the same, but Example 17 has 1% $As_2O_3$ as opposed to 0.5% in Example 1.

Hybrid composite articles, that is, articles containing both SiC whiskers and SiC continuous fibers were produced in accordance with the description in U.S. Pat. No. 4,615,987. Thus, a homogeneous suspension containing 15% by weight deagglomerated SiC whiskers was prepared from frit obtained from Example 1, using the above-described shear mixing technique. After drying, the mixture was blended into an organic binder and vehicle solution to form a slurry such as is also described above with respect to the fiber-containing composites. A prepreg was prepared by passing continuous SiC fiber through that slurry. Several prepregs were stacked and the organic components burned out. The stack of prepregs was hot pressed in a graphite mold having a molybdenum liner for 10 minutes at a pressure of 1500 psi and at a temperature of 1340° C. in an atmosphere of flowing nitrogen. The mold was cooled to 1200° C. and held at that temperature for two hours. The fiber content of the articles averaged about 35% by volume. Table IV provides a comparison of the mechanical properties of those products measured in terms of psi with those exhibited by composites prepared from Example 1 reinforced with 35% by volume fibers using the same processing conditions.

TABLE IV

|  | Hybrid | Fibers |
|---|---|---|
| MOR (25° C.) | 67,000 | 78,000 |
| MOR (1300° C.) | 108,000 | 58,000 |
| MCY (25° C.) | 54,000 | 35,000 |

The anomalous low room temperature MOR of the hybrid body was due to poor homogeniety of the green (unfired) body and fiber damage. The presence of whiskers led to an improvement in the MCY stress at room temperature. The tremendous increase in MOR at 1300° C. is believed to be the result of more effective load transfer to the fiber by the hybrid matrix compared to the whisker-free matrix.

Although the above description of hybrid composites employed SiC fibers (and the use of such fibers comprises the preferred embodiment), it will be appreciated that other inorganic fibers can be utilized in like manner. Examples of operable fibers include $B_4C$, carbon, mullite, $Si_3N_4$, spinel, $Al_2O_3$, BN, $ZrO_2$, and zircon.

We claim:

1. An integral whisker-reinforced, internally-nucleated glass-ceramic matrix composite of essentially full density having a use temperature in excess of 1300° C. consisting essentially of 5-60% by weight deagglomerated SiC whiskers having a thickness less than 100 microns with a length-to-diameter ratio of at least 5 substantially uniformly distributed in a glass-ceramic essentially free of $TiO_2$ and consisting essentially, expressed in terms of weight percent on the oxide basis, of 16-20% CaO, 38.5-46% $Al_2O_3$, 35-42% $SiO_2$, 0.25-1.5% $As_2O_3$, and up to 10% total of at least one nucleating agent in the indicated proportion selected from the group consisting of 0.1-3% $Cr_2O_3$, 0.25-3% $HfO_2$, 2-5% $MoO_3$, 0.25-3% $Nb_2O_5$, 0.25-3% $Ta_2O_5$, 0.25-3% $WO_3$, and 1-10% $ZrO_2$, wherein $Al_2O_3$ is present in an amount which is at least 10 mole percent and up to 50 mole percent in excess of that present in stoichiometric triclinic anorthite, and wherein the predominant crystal phases in the glass-ceramic matrix are triclinic anorthite and mullite and/or $\alpha$-$Al_2O_3$.

2. A composite according to claim 1 consisting essentially, expressed in terms of weight percent on the oxide basis, of 16-18% CaO, 40-46% $Al_2O_3$, 35-38% $SiO_2$, and 0.5-1.0% $As_2O_3$, plus nucleating agent.

3. An integral fiber-reinforced, internally-nucleated glass-ceramic matrix composite of essentially full density having a use temperature in excess of 1300° C. consisting essentially of 15-70% by volume SiC fibers substantially uniformly distributed in a glass-ceramic essentially free of $TiO_2$ and consisting essentially, expressed in terms of weight percent on the oxide basis, of 16-20% CaO, 38.5-46% $Al_2O_3$, 35-42% $SiO_2$, 0.25-1.5% $As_2O_3$, and up to 10% total of at least one nucleating agent in the indicated proportion selected from the group consisting of 0.1-3% $Cr_2O_3$, 0.25-3% $HfO_2$, 2-5% $MoO_3$, 0.25-3% $Nb_2O_5$, 0.25-3% $Ta_2O_5$, 0.25-3% $WO_3$, and 1-10% $ZrO_2$, wherein $Al_2O_3$ is present in an amount which is at least 10 mole percent and up to 50 mole percent in excess of that present in stoichiometric triclinic anorthite, and wherein the predominant crystal phases in the glass-ceramic matrix are triclinic anorthite and mullite and/or $\alpha$-$Al_2O_3$.

4. A composite according to claim 3 consisting essentially, expressed in terms of weight percent on the oxide basis, of 16-18% CaO, 40-46% $Al_2O_3$, 35-38% $SiO_2$, and 0.5-1.0% $As_2O_3$, plus nucleating agent.

5. An integral fiber- and whisker-reinforced, internally-nucleated glass-ceramic matrix hybrid composite body of essentially full density having a use temperature in excess of 1300° C. consisting essentially of about 15-70% by volume fibers selected from the group consisting of SiC, carbon, $B_4C_1Si_3N_4$, BN, mullite, spinel, $Al_2O_3$, zircon, and $ZrO_2$ and 5-60% by weight deagglomerated SiC whiskers having a thickness less than 100 microns with a length-to-diameter ratio of at least 5 substantially uniformly distributed in a glass-ceramic matrix essentially free of $TiO_2$ and consisting essentially, expressed in terms of weight percent on the oxide basis, of 16-20% CaO, 38.5-46% $Al_2O_3$, 35-42% $SiO_2$, 0.25-1.5% $As_2O_3$, and up to 10% total of at least one nucleating agent in the indicated proportion selected from the group consisting of 0.1-3% $Cr_2O_3$, 0.25-3% $HfO_2$, 2-5% $MoO_3$, 0.25-3% $Nb_2O_5$, 0.25-3% $Ta_2O_5$, 0.25-3% $WO_3$, and 1-10% $ZrO_2$, wherein $Al_2O_3$ is present in an amount which is at least 10 mole percent and up to 50 mole percent in excess of that present in stoichiometric triclinic anorthite, and wherein the predominant crystal phases in the glass-ceramic matrix are triclinic anorthite and mullite and/or $\alpha$-$Al_2O_3$.

6. A composite according to claim 5 consisting essentially, expressed in terms of weight percent on the oxide basis, of 16–18% CaO, 40–46% $Al_2O_3$, 35–38% $SiO_2$, and 0.5–1.0% $As_2O_3$, plus nucleating agent.

* * * * *